(12) United States Patent
Bogdan (10) Patent No.: US 6,169,984 B1
(45) Date of Patent: Jan. 2, 2001

(54) GLOBAL INCREMENTAL TYPE SEARCH NAVIGATION DIRECTLY FROM PRINTABLE KEYBOARD CHARACTER INPUT

(75) Inventor: Jeffrey L. Bogdan, Redmond, WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/053,446

(22) Filed: Apr. 1, 1998

(51) Int. Cl.[7] .................................................. G06K 17/30
(52) U.S. Cl. ............................ 707/3; 707/1; 707/2; 707/5
(58) Field of Search .................................. 707/3, 540, 1, 707/5, 2; 345/156, 352, 357, 356; 395/603, 160, 148; 364/980

(56) References Cited

U.S. PATENT DOCUMENTS

| | | | |
|---|---|---|---|
| 4,916,656 | * 4/1990 | Sasaki | 364/900 |
| 4,937,745 | * 6/1990 | Carmon | 364/419 |
| 5,312,478 | * 5/1994 | Reed et al. | 395/148 |
| 5,548,703 | * 8/1996 | Berry et al. | 395/160 |
| 5,692,173 | * 11/1997 | Chew | 395/603 |
| 5,796,404 | * 8/1998 | Gentner | 345/352 |
| 5,877,766 | * 3/1999 | Bates et al. | 345/357 |
| 6,072,485 | * 6/2000 | Barnes et al. | 345/339 |

* cited by examiner

*Primary Examiner*—Hosain T. Alam
*Assistant Examiner*—Ella Colbert
(74) *Attorney, Agent, or Firm*—Klarquist Sparkman Campbell Leigh & Whinston, LLP (57) ABSTRACT

A user interface control implementing a global keyboard navigation system by way of printable keyboard character input to extend an incremental type search across all window components within a defined scope. A recursive search is executed to match any number of printable characters input by a user to any component name of any window component among the parent and child generations existing in a given system within a defined scope. Repeat prefix searches for subsequent window component names are executed based on a user repeating the most recently input printable character that exists in an input buffer.

18 Claims, 8 Drawing Sheets

GLOBAL INCREMENTAL TYPE SEARCH NAVIGATION DIRECTLY FROM PRINTABLE KEYBOARD CHARACTER INPUT

RELATED APPLICATIONS

The present application is related to U.S. Pat. No. 5,692,173, issued on Nov. 11, 1997, titled "Method And System For Combining Prefix and First Character Searching Of A List".

FIELD OF THE INVENTION

The present invention relates to User Interface (UI) controls, and in particular, to User Interface controls that facilitate global navigation of components in a window environment directly from printable keyboard character input.

PROBLEM

User Interface controls, in the context of this document, are the mechanisms or processes that facilitate operational aspects of User Interface features that are available to a user. User Interface features typically have a visual aspect to them and are organized as objects called components. One example of the many different component types is a list box. When a list box is selected from its list box identifier on a display screen, the list box appears containing one or more further selectable list elements such as file names, folder names, or feature names. Each list element is also considered a component.

There are two common User Interface controls available to a user for searching and selecting components in a window environment. One of the User Interface controls is a free-style directional selection device such as a mouse. A second of the User Interface controls is keyboard input navigation. It is the User Interface control for keyboard input navigation among components that is the topic of this document.

Keyboard input navigation means that the user can input characters and/or control key combinations from a keyboard to navigate among various components whose mnemonic key matches the key or keys input by the user. It is common for a component's mnemonic key to be a single underlined character of the component's name and the underlined character is not necessarily the first character of the component name. However, one problem with mnemonic keys is that they create significant visual clutter on a display screen. Another problem with mnemonic key matching is that it is increasingly difficult to assign unique mnemonic keys for large numbers of sibling components and/or their component contents.

One solution to part, but not all, of the above identified problems is a keyboard input navigation technique called a hybrid incremental type search. See the above identified U.S. Patent titled "Method And System For Combining Prefix and First Character Searching Of A List" for details of an existing hybrid incremental type search. The existing hybrid incremental type search is a combination of a prefix search and a list search. A prefix search allows a user to enter one or more prefix characters that are used to search for a component name whose first few characters match the prefix characters entered by the user so far. However, one difficulty with the prefix searches alone is that the user needs to know the exact prefix of the desired list element to achieve an exact match without having to use directional keys to manually finish locating the desired component.

A list search, also known as a first character search, allows a user to sequentially search through a set of components to find the next component that matches the most recent character that was input by the user. For example, the user can repeatedly enter the letter "H" to locate successive components that begin with the letter "H". Although the user does not need to know the exact spelling of a component using the list search technique, using the list search alone can take a long time to traverse a long list of component names that each begin with the same letter.

The existing hybrid incremental search method combines the desirable attributes of the prefix search and the list search to facilitate additional flexibility in a User Interface window control. The existing hybrid incremental search saves the user input characters in an input buffer and attempts to match one or more of the input characters to a component in the same manner as previously disclosed in the prefix search. However, if each of the input characters is the same, then the prefix search searches for a component whose first character matches one of the input characters. If the first character of only one component matches, then that component is selected. Alternatively, if the first character of more than one component matches an input character, then which of the components to select is determined by which component is in closest proximity to a predetermined reference position among the entire set of components. A predetermined reference position might be the first component of the entire set for example.

Another problem with the existing hybrid incremental type search is that it does not address the visual clutter problem of underlined characters to identify mnemonic keys in part because only local level type search controls exist. Still another problem with the existing hybrid incremental type search is that the scope of the search is limited to components that have implemented their own type search control.

For these reasons, there exists an ongoing need for a global mechanism for direct keyboard navigation across multiple component generations. A system of this type has heretofore not been known prior to the invention as disclosed below.

SOLUTION

The above identified problems are solved and an advancement is achieved in the field of User Interface controls for keyboard input navigation due to the global incremental type search navigation system of the present invention. The global incremental type search navigation system of the present invention is an extension of the existing hybrid incremental type search technology. The extension beyond the existing hybrid incremental type search technology includes, but is not limited to, navigation based on only printable keyboard character input, and global navigation across multiple hierarchical levels of components based on a designated User Interface scope within a component family hierarchy.

The global incremental type search navigation system of the present invention collects a user's keyboard input characters in an input buffer as each character is typed. A recursive search is then initiated down through all generations of each child component from an active parent component, and then up through all generations of the active parent component's parents subject to the designated scope, until a component is found whose display name begins with the assembled prefix characters. The user need only type printable characters for this global search to occur, and the user need only input the minimum number of characters that are necessary to uniquely identify the desired component. This technique facilitates a broader scope of a component search that not only includes the immediate active window components but the entire set of window components supported by a User Interface subject to a designated scope. This technique also eliminates the visual clutter produced by marking a mnemonic key character in each component.

DETAILED DESCRIPTION

Figure 1:
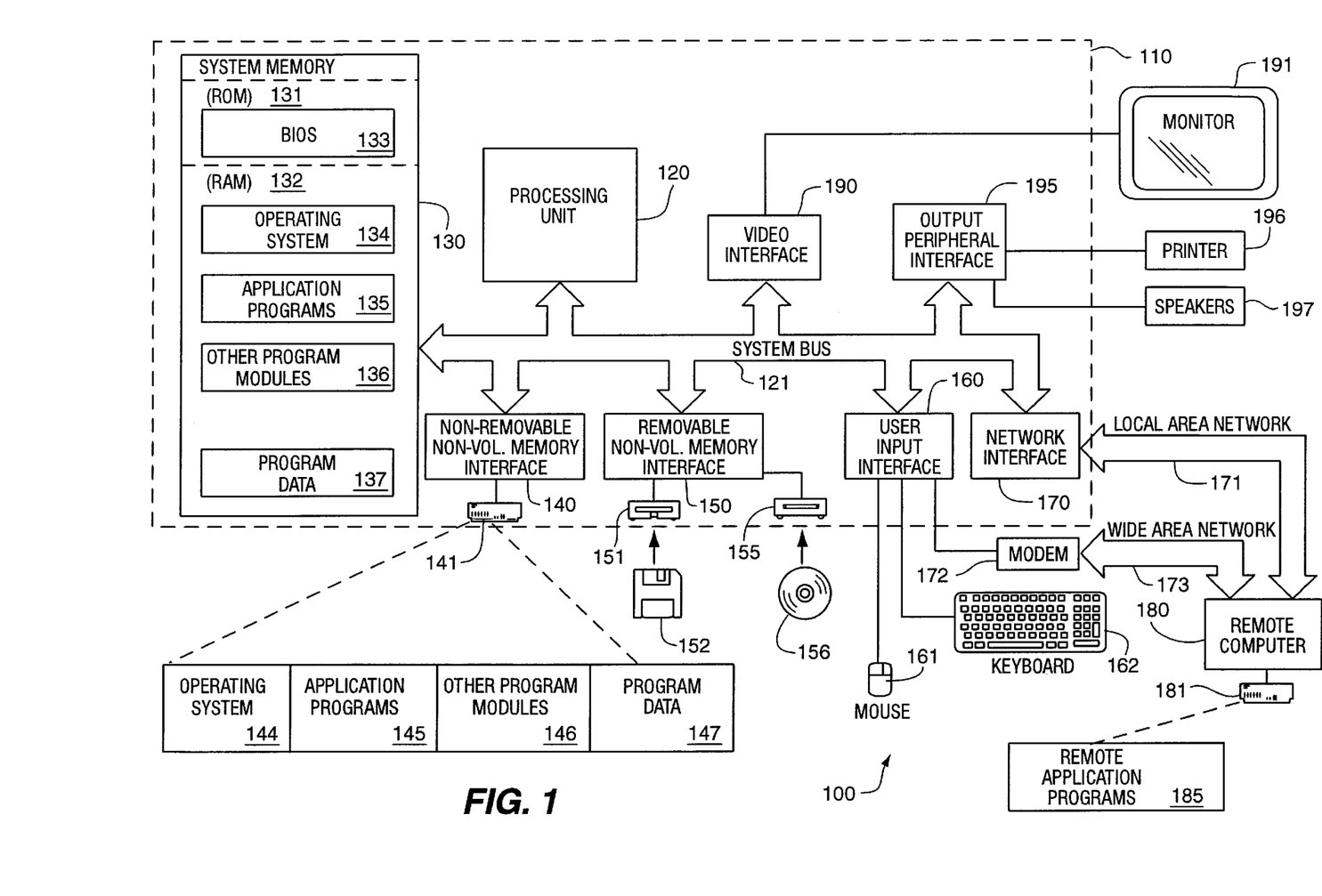
FIG. 1 illustrates an example of a computing system environment example in block diagram form on which the claimed invention can be implemented.

Computing System Environment—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multi-processor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The numerous peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like. User input interface 160 supports user input devices that can include, but are not limited to, a pointing device 161 commonly referred to as a mouse or touch pad, and a keyboard 162. Other user input devices can include, but are not limited to, a microphone, joystick, game pad, neuro-stimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197. Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Figure 2:
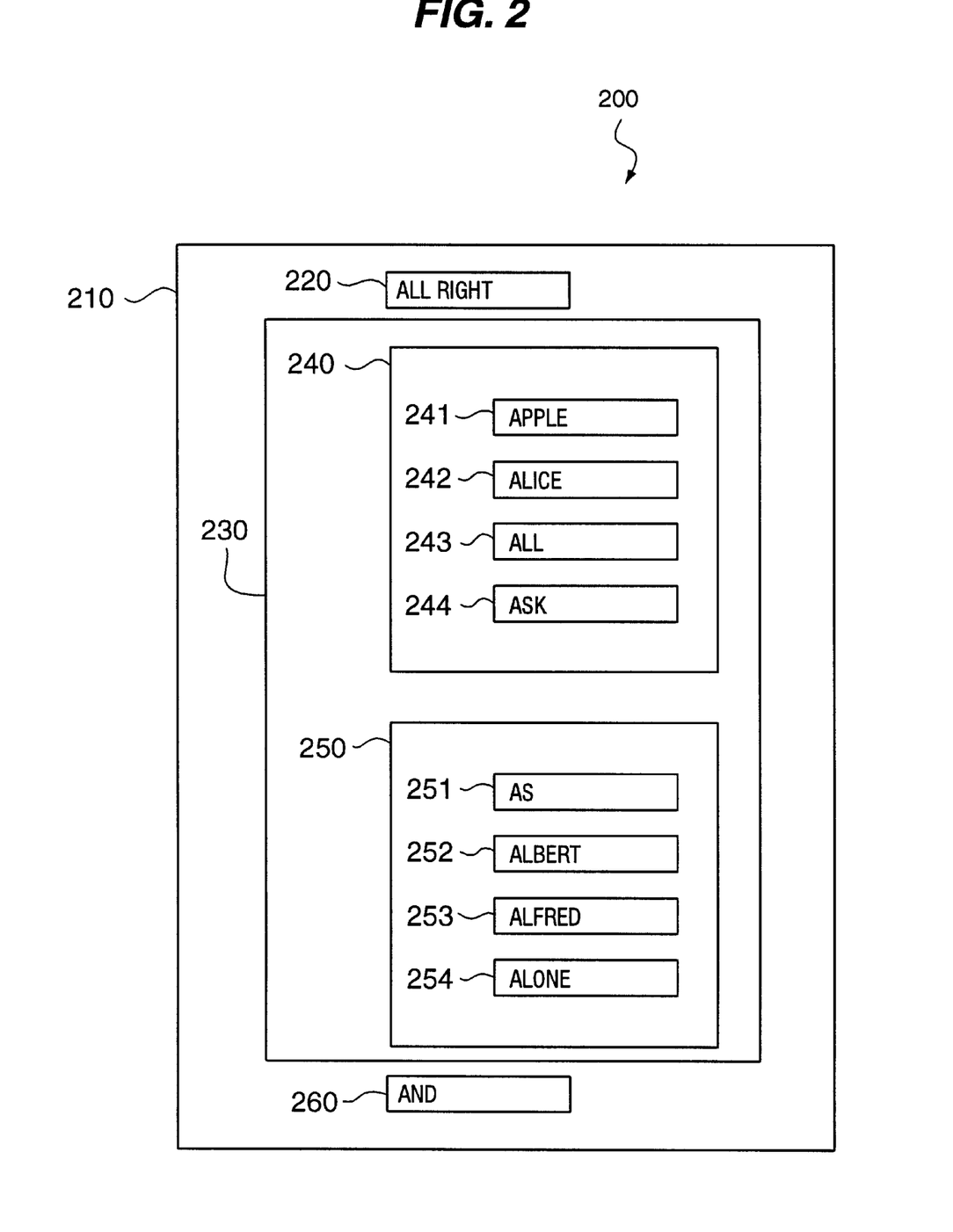
FIG. 2 illustrates an example of component and container relationships in block diagram form.
Figure 3:
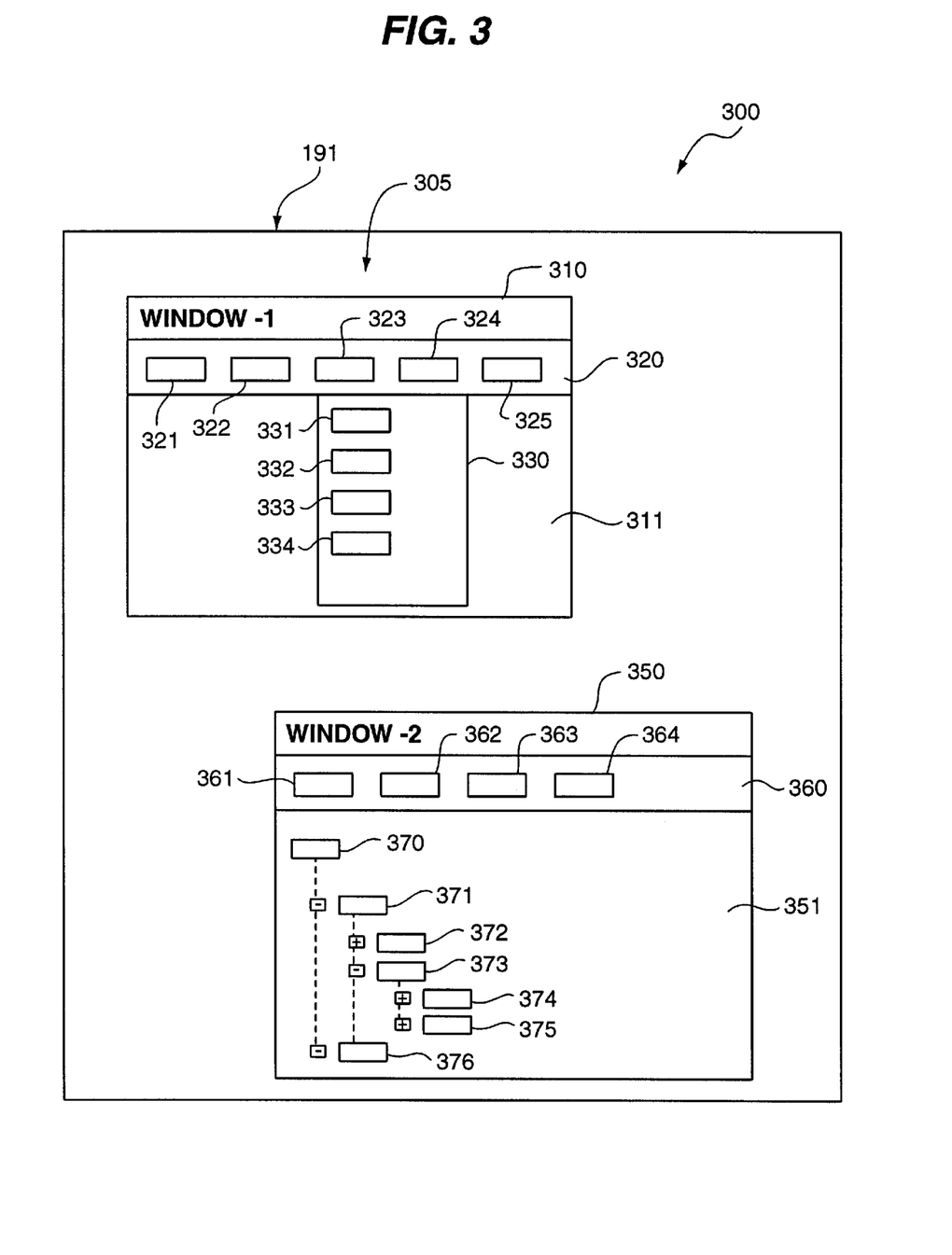
FIG. 3 illustrates specific examples of a component hierarchy in a window environment in block diagram form.

Component Hierarchy Examples—FIGS. 2–3

FIG. 2 illustrates an example of component and container relationships 200 in block diagram form. For purposes of the present discussion, a component is any visual object or element on a display screen. A container is a component that contains one or more other components. A viewer is a container that has the additional responsibility of dynamically controlling viewable component content. Components, containers, and viewers, are typically organized hierarchically and can be referred to more generically as parent components and child components at any given level of a component family hierarchy.

The component and container relationship example 200 illustrates 14 hierarchically organized components 210–260. Component 210 is at the top of the hierarchy and is referred to as the top level component. However, a top level component does not necessarily mean that it is as the root of a component family hierarchy. Components 220, 230, and 260 are sibling components also referred to as children to the parent or top level component 210. Component 230 is also referred to as a container or parent component because it contains additional child components 240–254. Containers may also be viewers or scroll viewers that are a common sub-level of a hierarchy below a top level component. Components 241–244 and 251–254 are the lowest level components and are children of parent components 240 and 250 respectively.

One important aspect of a component family hierarchy such as the component and container example 200 is that a scope can be defined to bound a search across different levels of the component family hierarchy. For example, a search can be limited to the contents of container 250 by defining the scope accordingly. If the extent of the scope is limited to component 250 then a search for the word ALFRED will be found in component 253, however, a search for the word ALICE will not be found because it is in component 242 which is beyond the defined scope. Similarly, if the scope is defined as anything within container 230, then both words ALICE and ALFRED will be found in components 242 and 253 respectively. Finally, a scope that is defined at the top level component 210 means that components 220, 230, and 260 are searchable.

FIG. 3 illustrates a component hierarchy example 300 in block diagram form as it might appear on the display screen of monitor 191. Each of the components in hierarchy examples 300 are generated from either a host operating system 134 and/or one or more applications 135.

For purposes of the present discussion, a window component or simply a component, can be any window object on a display screen. For example, the host operating system 134 can generate a baseline window component 305 that can itself contain window components or be the User Interface point from which other components are launched. In the window component hierarchy example 300 the baseline window component 305 contains two child components referred to as window-1 310 and window-2 350.

Window-1 310 illustrates a window that is a top level component that might be used by a word processing application or a spread sheet application. The main window body 311 is the portion of window-1 310 that has input focus by default. Other lower level window components within window-1 310 include, but are not limited to, the menu bar 320, the menu bar elements 321–325, the list box 330, and the list elements 331–334 respectively, listed in hierarchical order. The list box 330 is intended to portray the window component that results from selecting menu bar element 323.

Note that the window components 320–334 that exist at a lower hierarchical level from window-1 310 are not keyboard navigable without the user expressly changing the input focus away from the main window body 311 of window-1 310. One way to break scope to change the input focus is by selecting another window component by way of the mouse pointer and selection device 161. Another way to break scope to change the input focus is by pressing a predetermined key or key combination such as the ALT key for example. Any other method or key for breaking scope to change the input focus can be used beyond the two examples just discussed. No matter what method of breaking scope is used, the global incremental type search navigation system using only printable keyboard characters is active and available for use should the user so choose from the top level component.

The user does have other window component navigation options available that are beyond the scope of the present discussion and can include, but are not limited to any one or combination of, continued use of the mouse pointer and selection device 161, or the directional keys on keyboard 162 that can include the directional arrow keys, the TAB key, the space key, or the ENTER key. It is important to note that although the emphasis of the present discussion is on global incremental type search navigation using only printable keyboard characters, any of the previously mentioned window component navigation systems can be used in alternating combination with the global incremental type search navigation system using only printable keyboard characters. That is, the global navigation aspect of the present invention itself is functional regardless of the user input that is used to direct the navigation.

Window-2 350 illustrates a different style of window that can also be a top level component where the main window body 351 has input focus for component navigational purposes as its default. That is, the global incremental type search navigation system using only printable keyboard characters is initially active any time window-2 350 itself has input focus. Other lower level window components within window-2 350 include, but are not limited to, menu bar 360 and menu bar elements 361–364 that function in a manner similar to the menu bar 320 and menu bar elements 321–325 previously disclosed for window-1 310. Additional window components within the main window body 351 include hierarchical display components 370–376. Example of hierarchical display components 370–376 can include, but are not limited to, a hierarchical file system display of files and/or folders, or a hierarchical network node display, or a combination of a file system and network node display. Each of the window components 360–376 are navigable by way of the global incremental type search system of the present invention using only printable keyboard characters.

Global Navigation Operational Steps—FIGS. 4–8

Figure 4:
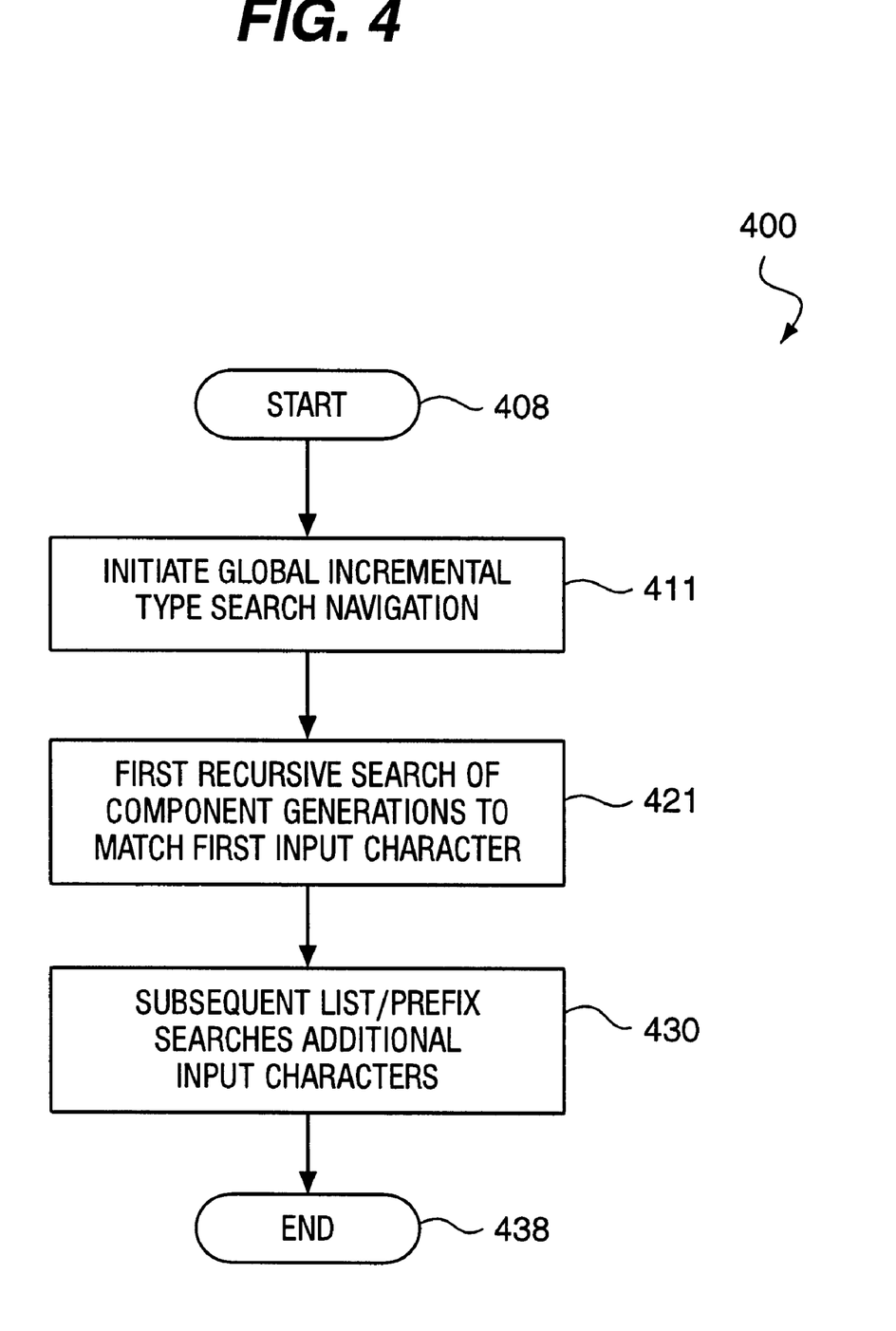
FIG. 4 illustrates an overview of the global keyboard navigation system operational steps in flow diagram form.

FIG. 4 illustrates an operational overview 400 in flow diagram form for the global incremental type search navigation system using printable keyboard characters. The operational overview 400 starts at step 408 and proceeds to step 411 where the global incremental type search navigation system is initiated by user input command. As previously disclosed in the text accompanying FIG. 3, initiating the global incremental type search navigation system can occur in different manners depending on the controls that exist for a given window component. The common factor among the different manners is that scope is broken and the input focus redirected to accept keyboard navigational input.

The remaining steps 421 and 430 comprise the body of the global incremental type search navigation system. Details of step 421 are disclosed in further detail in the text accompanying FIG. 5. Details of step 430 are disclosed in further detail in the text accompanying FIGS. 6–8.

At step 421, a recursive search of all parent and child generations occurs to find a match between the first character of keyboard input from the user and the first character of a component name. The recursive search means that all generations of child components and parent components are searched starting from the present component throughout the component family hierarchy within the bounds of the defined scope. If a match is not found among one of the child generations of the present component, then the search continues through the child generations of the present component's parent and on up the parent hierarchy until either a match is found, or there are no remaining components to search within the defined scope.

The global incremental type search navigation system continues at step 430 with an ongoing list and/or prefix search until a desired component is identified within the defined scope or the user stops typing keyboard characters for a predefined timer interval. The ongoing list and/or prefix searching allows a user to further clarify the keyboard input string that is being compared to component names, or to repeat the most recently typed character of the string to find subsequent occurrences of a given keyboard input string. If the desired component is identified or the user stops typing keyboard characters for a predefined timer interval, then the global incremental type search navigation system stops at step 438. Subsequent global incremental type search navigation can continue as needed at step 408.

Figure 5:
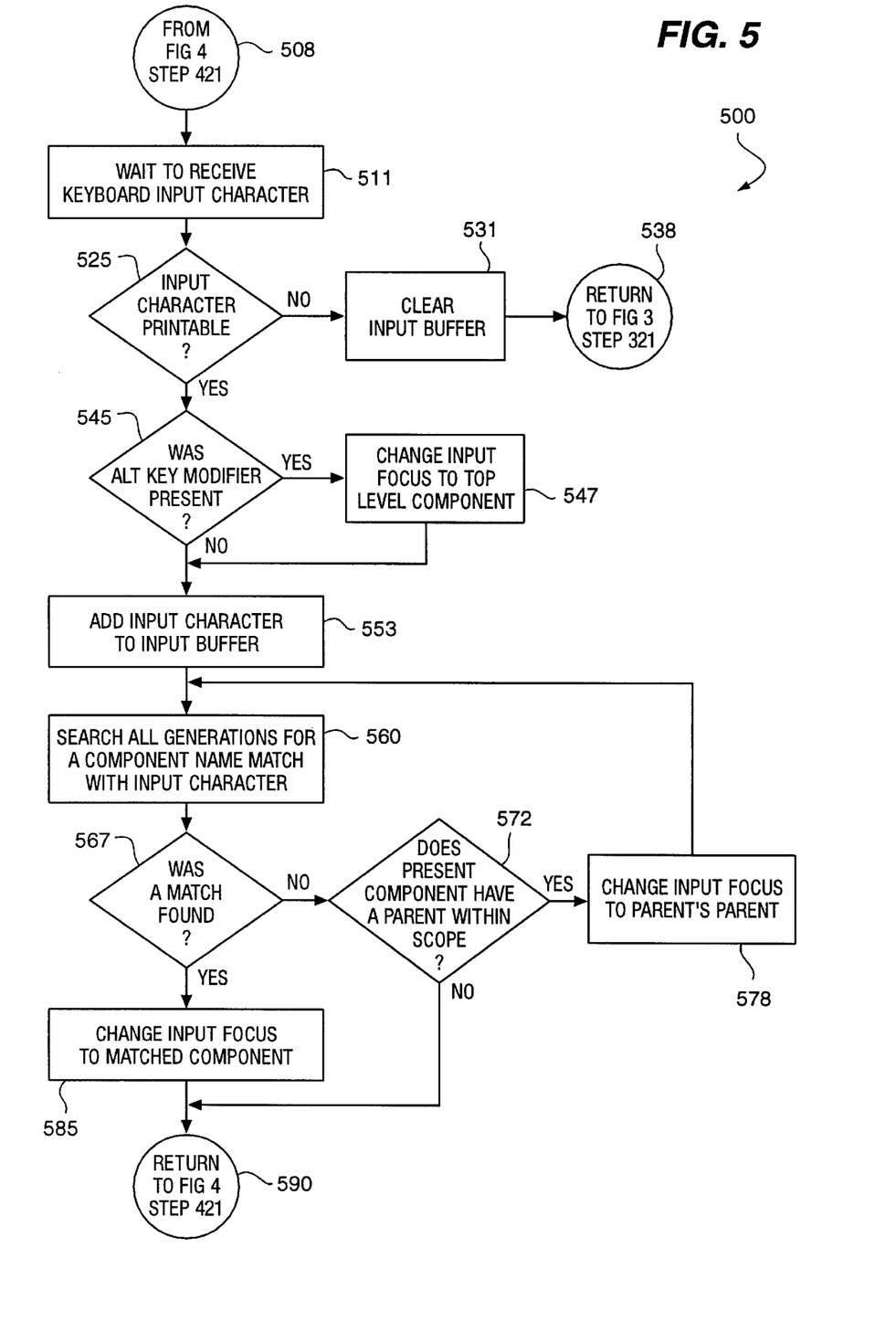
FIG. 5 illustrates the recursive search operational steps in flow diagram form.

FIG. 5 illustrates the recursive search operational steps 500 of the global incremental type search navigation system in flow diagram form. The recursive search operational steps 500 start at step 508 and are the details of step 421 from FIG. 4.

At step 511, the system waits to receive a keyboard input character from a user typing at a keyboard. The system will wait indefinitely at step 511 if no keyboard input is ever entered or no deliberate user action is taken to break scope from the present input focus by way of either keyboard input or mouse directed input. For purposes of the present discussion it is understood that keyboard input is eventually present and processing continues at step 525. If upon examining the keyboard input character it is determined at decision step 525 that the input character is not a printable keyboard character, then processing continues at step 531. The definition of a printable keyboard character is set forth below. At step 531, the input buffer is cleared of any contents and processing ends at step 538 for purposes of the global keyboard navigation system using printable keyboard characters, by returning to step 438 of FIG. 4. Alternatively, if it is determined at decision step 525 that the input character from step 511 is a printable keyboard character, then processing continues at step 545.

A printable character for purposes of the present discussion include the traditional alphabetic, numeric, or special characters as exemplified by an English language keyboard where special characters do not include characters generated by keys including, but not limited to, the directional arrow keys, CNTL, ESC, ENTER, TAB, or SHIFT keys. Note that the scope of this definition of printable keyboard character is intended to include foreign language printable character counterparts of User Interface systems that are designed for non-English speaking configurations.

If it is determined at decision step 545 that the ALT key modifier was present along with the input character from step 511, then processing continues at step 547. At step 547, the present scope of input is broken and the input focus is redirected to the top level component among the set of components that exists, and processing continues at step 553. Breaking scope can be signaled by any keystroke combination, however, the ALT key is commonly used for this purpose. Alternatively, if it is determined at decision step 545 that the ALT key modifier was not present along with the input character from step 511, then processing proceeds directly to step 553.

At step 553, the input character from step 511 is now added to the input character buffer. The input character buffer, also known as the input buffer or buffer, contains the existing string of printable characters that have been input by a user in the order that they have been input up to the present time.

At step 560, a recursive search is executed through all generations of components to find a component name that matches the input buffer characters. The first time through this recursive search there is only one input character in the input buffer so that the single character is matched with the first character of a component name. The recursive search begins with the present component's children and down through the generations of the children's children. If it is determined at decision step 567 that no match is found among the child generations from the present component, the processing continues at step 572.

If it is determined at decision step 572 that the present component has a parent component that is within the defined scope, then processing continues at step 578. At step 578 the input focus is changed from the present component to its parent component and the recursive searching for an input character match continues at step 560 as previously stated. Alternatively, if it is determined at decision step 572 that the present component does not have a parent, then processing continues at step 590 by returning to step 421 of FIG. 4. Because the present component has no parent component and because no match has been found for any of the present component's child components, then additional input characters will not help and the input character timer will expire in step 430 to end the present global keyboard navigation iteration. The input character timer is a predetermined time limit timer that restarts for each input character. The purpose of the timer is to distinguish between input characters occurring over a reasonably proximate time period versus characters that are separated by significant pauses. Any predetermined time limit can be used and the typical timer is one or two seconds between characters.

Alternatively, if it is determined at decision step 567 that a match is found among the child generations from the present component, then processing continues at step 585. At step 585, the input focus is changed from the present component to the matched child component. The recursive search phase of the global keyboard navigation system ends at step 590 by returning to step 421 of FIG. 4.

Figure 6:
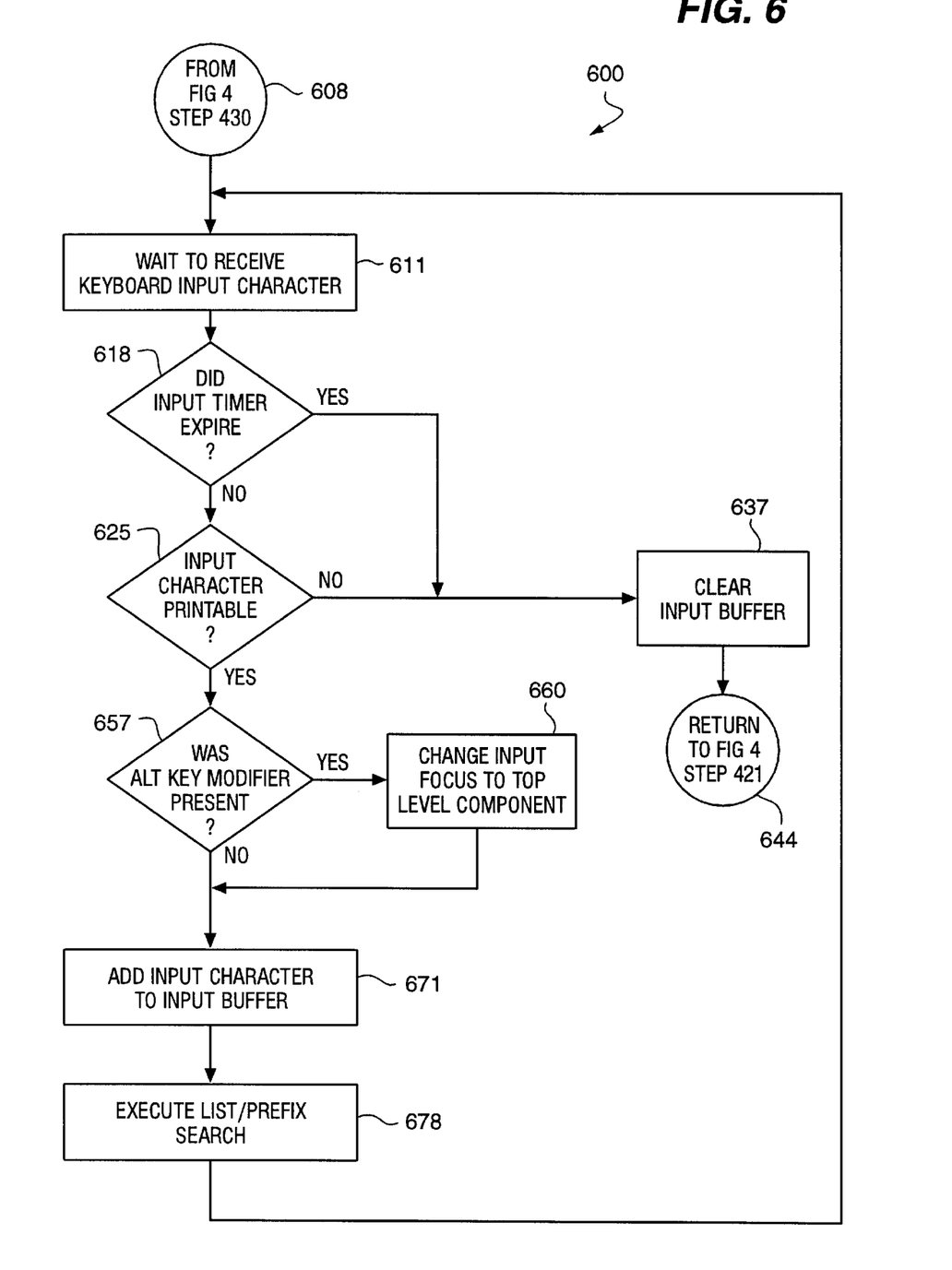
FIG. 6 illustrates the list and prefix search operational overview in flow diagram form.

FIG. 6 illustrates the list and prefix search operational steps 600 of the global incremental type search navigation system in flow diagram form. The list and prefix search operational steps 600 start at step 608 and are the details of step 430 from FIG. 4.

At step 611, the system waits to receive an additional keyboard input character from a user typing at a keyboard. The system will not wait indefinitely at step 611 because the keyboard input timer is tracking the time since the last keystroke. If it is determined at decision step 618 that the predetermined keyboard input timer has expired since the last input character was received, then processing continues at step 637. At step 637, the input buffer is cleared of any input character contents. Processing ends at step 644 for purposes of the global keyboard navigation system using printable keyboard characters, by returning to step 438 of FIG. 4. Alternatively, if it is determined at decision step 618 that the keyboard input timer has not expired since the last input character was received, then processing continues at step 625.

If upon examining the most recent keyboard input character it is determined at decision step 625 that the input character is not a printable keyboard character, then processing continues at step 637. At step 637, the input buffer is cleared of any input character contents. Processing ends at step 538 for purposes of the global keyboard navigation system using printable keyboard characters, by returning to step 438 of FIG. 4. Alternatively, if it is determined at decision step 625 that the most recent input character from step 611 is a printable keyboard character, then processing continues at step 657.

If it is determined at decision step 657 that the ALT key modifier was present along with the input character from step 611, then processing continues at step 660. At step 660, the present scope of input is broken and the input focus is redirected to the top level component among the set of components that exists, and processing continues at step 671. Breaking scope can be signaled by any keystroke combination, however, the ALT key is commonly used for this purpose. Alternatively, if it is determined at decision step 657 that the ALT key modifier was not present along with the input character from step 611, then processing proceeds directly to step 671.

At step 671, the most recent input character from step 611 is now added to the input character buffer. The input character buffer, also known as the input buffer or buffer, contains the existing string of printable characters that have been input by a user in the order that they have been input up to the present time.

At step 678, a list and/or prefix search is executed through all generations of child components to find a component name that matches the existing input buffer characters. The list and/or prefix search begins with the present component's first child and down through the generations of the children's children as previously disclosed. Details of the list and prefix search are disclosed in the text accompanying FIGS. 7–8. At the completion of the list and prefix search, processing continues at step 611 as previously disclosed.

Figure 7:
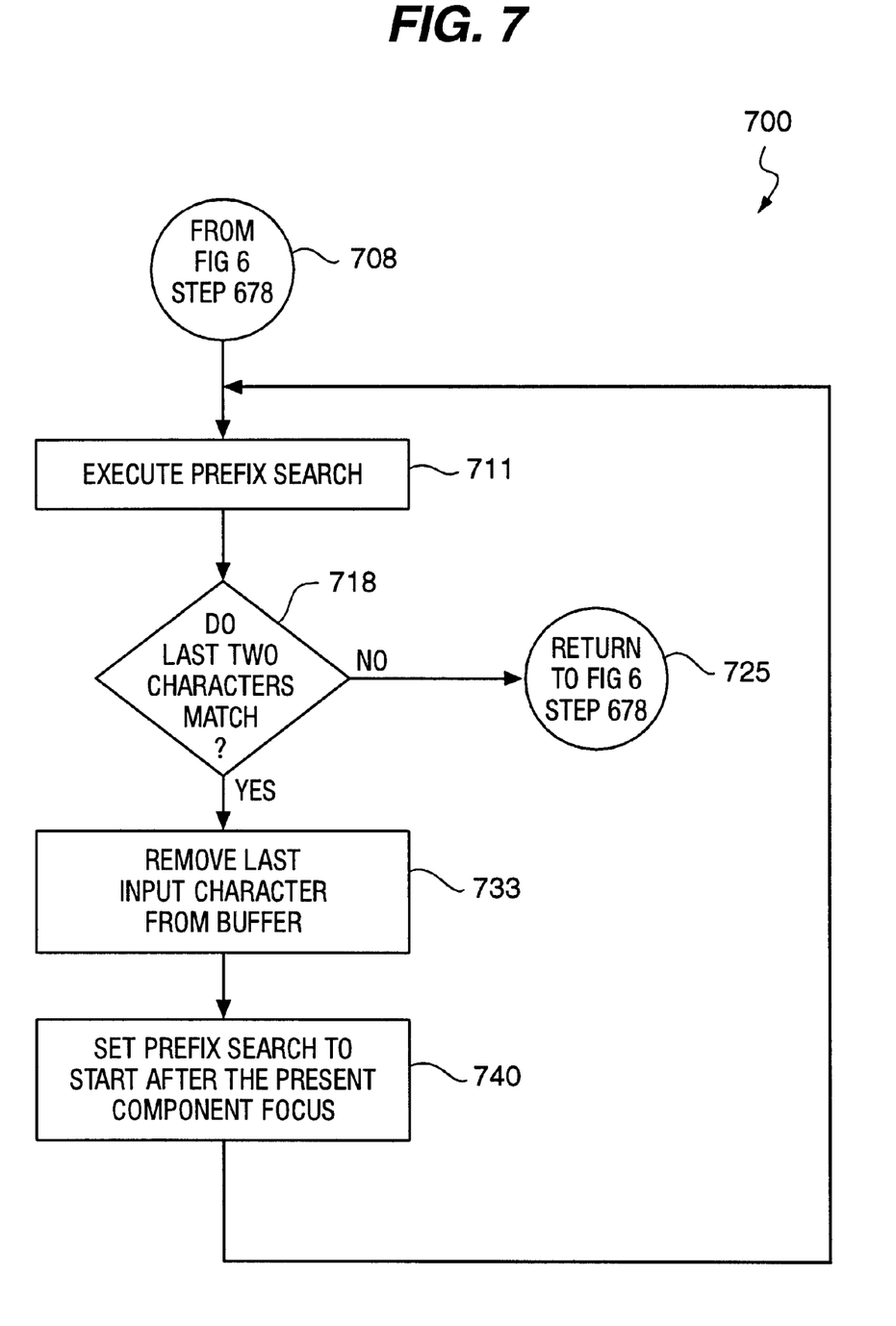
FIG. 7 illustrates the list search operational steps in flow diagram form.

FIG. 7 illustrates the list search operational steps 700 of the global incremental type search navigation system in flow diagram form. The list search operational steps 700 start at step 708 and are the details of step 678 from FIG. 6.

At step 711, the prefix search steps are executed based on the input characters presently in the input buffer. Details of the prefix search operational steps are disclosed in the text accompanying FIG. 8. If it is determined at step 718 that the last two input characters in the input buffer are not the same characters, then processing continues at step 725 by returning to step 678 of FIG. 6. Alternatively, if it is determined at decision step 718 that the last two input characters in the input buffer are the same characters, then processing continues at step 733.

At step 733, the last character of the input buffer is removed from the input buffer. The prefix search starting point is then set to the next component following the present component at step 740, and the prefix search is repeated at step 711 as previously disclosed. One reason for removing the last character from the input buffer is because the prefix search has already had a chance to match the input string with a component name having two identical characters and now the prefix search can be executed to find the next occurrence of a component name that matches the input string up to the most recent input character. That is, the user can search for the third occurrence of a component having the prefix ADMIN by typing ADMIN followed by a second N and then a third N. Thus, the user can implement a more specific component name search than was previously possible in prior incremental search systems that allowed only a first character search by retyping A numerous times to step through all occurrences of component names that start with the letter A.

Figure 8:
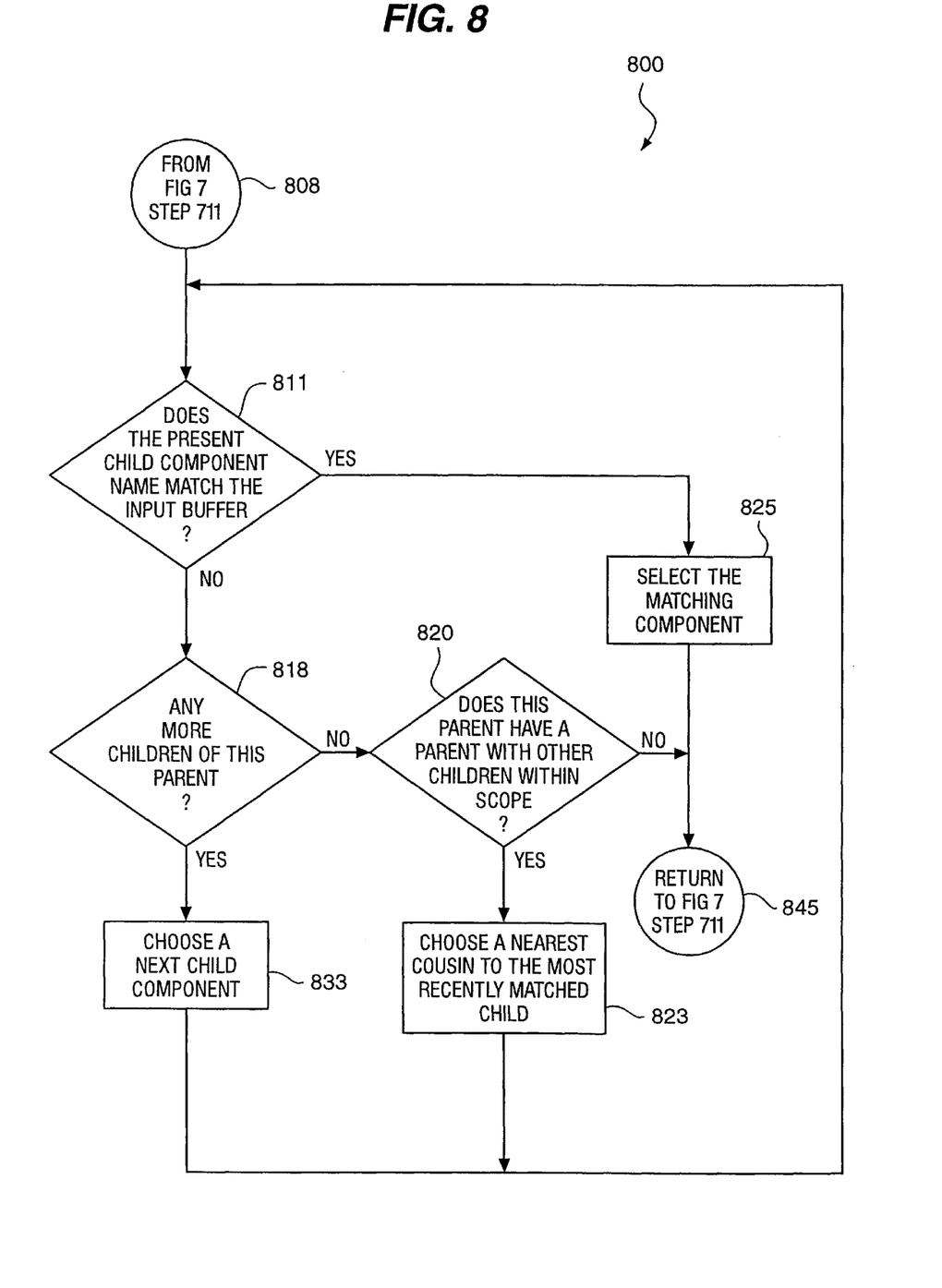
FIG. 8 illustrates the prefix search operational steps in flow diagram form.

FIG. 8 illustrates the prefix search operational steps 800 of the global incremental type search navigation system in flow diagram form. The prefix search operational steps 800 start at step 808 and are the details of step 711 from FIG. 7.

If it is determined at step 811 that the name of the present child component matches the characters in the input buffer, then the matching component is selected at step 825 and prefix processing is complete at step 845 by returning to step 711 of FIG. 7. Alternatively, if it is determined at decision step 811 that the name of the present child component does not match the characters in the input buffer, then processing continues at step 818.

If it is determined at decision step 818 that there are no additional children for the present parent component, then processing proceeds to step 820. Alternatively, if it is determined at decision step 818 that there are additional children for the present parent component, then matching continues at step 811 as previously disclosed.

If it is determined at decision step 820 that the present parent component of step 818 itself has a parent component having other children that are within the defined scope, then processing continues at step 823. Alternatively, if it is determined at decision step 820 that the present parent does not itself have a parent component with other children that are within the defined scope, then processing continues at step 845 by returning to step 711 of FIG. 7. At step 823, a child of the present parent's parent is chosen for the next iteration of processing and processing continues at step 811 as previously disclosed. In other words, a nearest cousin component of the most recently processed child component is the one chosen as the next child component that will be tested for a match with the input buffer.

To illustrate the significance of steps 818, 820, and 823, consider the component and container relationship example 200. Assume that the defined scope is limited to the contents of container 230 and that navigation has proceeded up through container 250 from component 254 through 251 such that component 251 was the last child component available for consideration in parent component 250. At step 818 of FIG. 8, there would be no more children of the present parent 250 and processing would proceed to step 820. At step 820, the present parent 250 itself has a parent 230, and parent 230 does have other children 240 that are within the defined scope. For this reason, at step 823 the child component 244 of parent 240 is the nearest cousin to the most recently tested child component 251, so that component 244 is selected as the next child component for processing at step 811. Stepping through child components in this manner treats the contents of container 230 as siblings of the same hierarchical level.

Summary

The global incremental type search navigation system using only printable keyboard characters recursively searches up and down all generations of all parent and child components in a component family hierarchy within a defined scope to find a name that matches an existing input string. A prefix search can also be incrementally executed through a series of components by repeatedly typing the last character of the input string as many times as desired. Although specific embodiments of the present invention are disclosed herein, it is expected that persons skilled in the art can and will make, use, and/or sell alternative global incremental type search navigation systems using only printable keyboard characters in a manner that is within the scope of the following claims either literally or under the Doctrine of Equivalents.

What is claimed is:

1. A computer-implemented method for incremental type search navigation among a plurality of components in a hierarchy having at least two levels by way of at least one printable keyboard character input, said method comprising:

storing said at least one printable keyboard character input in an input buffer;

recursively searching plural levels of said plurality of components within a defined scope in the hierarchy having at least two levels to find a component within the defined scope in the hierarchy that matches said at least one printable keyboard character input in said input buffer; and responsive to finding a component within the defined scope in the hierarchy that matches said at least one printable keyboard character input in said input buffer, changing an input focus from an active one of said plurality of components to an identified one of said plurality of components in the hierarchy that matches said at least one printable keyboard character input in said input buffer;

wherein the defined scope encompasses only a subset of components in the hierarchy having at least two levels.

2. A method according to claim 1 further comprising:

defining said defined scope to encompass only a subset of said plurality of components;

receiving a plurality of printable keyboard characters generated by a user into an input buffer; and navigating said plurality of components in the hierarchy based on an incremental type search via said printable keyboard characters.

3. A method according to claim 2 further comprising:

identifying ones of said keyboard character input that are printable and occur in combination with a predefined modifier key indicative of a directive to break outside the defined scope in the hierarchy;

responsive to receiving a keyboard character in combination with the predefined modifier key indicative of a directive to break outside the defined scope in the hierarchy, breaking outside the defined scope in the hierarchy from said active one of said plurality of components; and reestablishing a search start point from a top level component within said plurality of components.

4. A method according to claim 1 wherein said recursively searching comprises:

identifying said active one of said plurality of components;

searching down through each level of child components from said active one of said plurality of components within the defined scope in the hierarchy;

determining that all of said child window components of said active one of said plurality of components have been searched;

propagating said search up to a next higher parent component of said active one of said plurality of components within the defined scope in the hierarchy; and continuing said search of each child component level from a perspective of successive parent component levels until all parent component and child component levels are searched within said defined scope in the hierarchy.

5. A computer-readable medium having computer-executable instructions for performing the method of claim 4.

6. A method according to claim 1 wherein said input buffer has a second character and said recursively searching comprises:

identifying duplicate characters in said input buffer beyond the second character in said input buffer; and executing a repeat prefix search in response to said identifying duplicate characters in said input buffer beyond the second character, wherein said repeat prefix search is based on any number of printable keyboard characters presently in said input buffer up to a first one of said duplicate characters.

7. A computer-readable medium having computer-executable instructions for performing the method of claim 1.

8. A product for use in a global incremental type search navigation system to navigate among a plurality of components in a hierarchy having at least two levels by way of at least one printable keyboard character input, said product comprising:

a keyboard input buffer system, a keyboard input interval timer system, and a recursive search engine;

said keyboard input interval timer system being operational to time an interval between keyboard characters input by a user;

said keyboard input buffer system being operational to store said at least one printable keyboard character input that occurs within an unexpired time frame of an interval timer into a keyboard input buffer; and said recursive search engine being operational to search a plurality of levels of said plurality of components within a defined scope in the hierarchy for a component name that matches said at least one printable keyboard character input in said keyboard input buffer, wherein said recursive search engine is further operational to identify one of said plurality of components that matches said at least one printable keyboard character input in said keyboard input buffer to which an input focus is changed.

9. A product according to claim 8 wherein said keyboard input buffer system is further operational to:

identify ones of said keyboard character input that are printable and that occur in combination with a predefined modifier key, and in response to a modifier key indicative of a directive to break scope, breaking outside the defined scope from said active window component input focus and reestablishing a search start point from a top level component within said plurality of components.

10. A product according to claim 8 wherein said recursive search engine is further operational to:

identify an active one of said plurality of components;

search down through each level of child components from said active one of said plurality of window components within the defined scope in the hierarchy;

determine that all of said child components of said active one of said plurality of components have been searched within said defined scope;

propagate said search up to a parent component of said active one of said plurality of components within said defined scope in the hierarchy; and continue said search of each child component level from a perspective of each parent component level within said defined scope in the hierarchy until all parent component and child component levels are exhausted.

11. A product according to claim 8 wherein said keyboard input buffer has a second character and said recursive search engine is further operational to:

identify duplicate characters in said keyboard input buffer beyond the second character in said keyboard input buffer; and execute a repeat prefix search in response to duplicate characters in said keyboard input buffer beyond the second character, wherein said repeat prefix search is based on any number of printable keyboard characters presently in said keyboard input buffer up to a first one of said duplicate characters.

12. In a computer system having a user interface comprising a plurality of user interface elements in a hierarchy having at least two levels, wherein one of the plurality of user interface elements can have an input focus, a method for navigating among the user interface elements in the hierarchy via incremental type search, the method comprising:

accepting an ordered set of one or more printable characters typed at a keyboard of the computer system;

searching within the hierarchy for a user interface element matching the ordered set of one or more printable characters according to an incremental type search technique;

as a result of searching within the hierarchy for a user interface element matching the ordered set of one or more printable characters according to the incremental type search technique, finding a user interface element matching the ordered set of one or more printable characters according to an incremental type search technique; and responsive to finding a user interface element matching the ordered set of one or more printable characters according to an incremental type search technique, changing the input focus to the matching user interface element.

13. A computer-readable medium having computer-executable instructions for performing the method of claim 12.

14. The method of claim 12 wherein a defined scope encompasses a subset of the plurality of user interface elements in at least two levels in the hierarchy; and the searching is limited to user interface elements within the defined scope.

15. The method of claim 12 wherein a defined scope encompasses a subset of the plurality of user interface elements in at least two levels in the hierarchy, the method further comprising:

searching within the hierarchy only within the defined scope for a user interface element matching the ordered set of one or more printable characters according to an incremental type search technique;

receiving a keystroke indicative of a directive to break outside the defined scope; and responsive to receiving the keystroke, expanding searching to user interface elements in the hierarchy outside the defined scope.

16. The method of claim 12 wherein the incremental type search technique is a hybrid incremental type search, wherein the ordered set of one or more printable characters is a set of two or more characters comprising a set of k characters, and a match is determined according to a method comprising:

determining if the first k characters of a user interface element match the ordered set of one or more printable characters;

responsive to determining the first k characters of a user interface element match the ordered set of one or more printable characters, setting the matching user interface element as a proposed match;

encountering an nth successive duplicate character beyond the second character in the ordered set of one or more printable characters;

responsive to encountering an nth duplicate character beyond the second character in the ordered set of one or more printable characters, setting the nth occurrence of a user interface element having its first k characters matching the first k characters in the ordered set of one or more printable characters as the proposed match; and designating the proposed match as the match.

17. The method of claim 12 wherein the searching comprises:

searching an initial set of user interface elements having a common parent within the hierarchy for a user interface element matching the ordered set of one or more printable characters according to the incremental type search technique;

as a result of searching the initial set, determining the initial set fails to contain a user interface element matching the ordered set of one or more printable characters according to the incremental type search technique; and responsive to determining the initial set fails to contain a user interface element matching the ordered set of one or more printable characters according to the incremental type search technique, expanding the searching to include user interface elements having a parent in common with the initial set.

18. The method of claim 17 wherein the parent in common with the initial set is an immediate parent of the initial set.

* * * * *